(12) United States Patent
Boecker et al.

(10) Patent No.: US 12,023,844 B2
(45) Date of Patent: Jul. 2, 2024

(54) METHOD FOR PRODUCING A TUBE ARRANGEMENT FOR THE TRANSPORT OF TEMPERING MEDIUM

(71) Applicant: TI Automotive Technology Center GmbH, Rastatt (DE)

(72) Inventors: Albert Boecker, Ettlingen (DE); Matthias Winter, Rastatt (DE); Thorsten Schaefer, Steinfeld (DE); Florian Deibel, Sinzheim (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 16 days.

(21) Appl. No.: 17/338,061

(22) Filed: Jun. 3, 2021

(65) Prior Publication Data

US 2021/0379811 A1 Dec. 9, 2021

(30) Foreign Application Priority Data

Jun. 3, 2020 (EP) .................................... 20178064

(51) Int. Cl.
 *B29C 49/20* (2006.01)
 *B29C 49/42* (2006.01)
 (Continued)

(52) U.S. Cl.
 CPC .......... *B29C 49/20* (2013.01); *B29C 49/4278* (2013.01); *B29C 49/786* (2013.01);
 (Continued)

(58) Field of Classification Search
 CPC ... B29C 49/20; B29C 49/4273; B29C 49/786; B29C 69/001; B29C 49/4278;
 (Continued)

(56) References Cited

U.S. PATENT DOCUMENTS 8,431,067 B2 * 4/2013 Rowley ............... B29C 49/4252
 264/516
2011/0140314 A1 * 6/2011 Grauer .................... B29C 49/20
 264/516

(Continued)

FOREIGN PATENT DOCUMENTS

CN 110783663 2/2020
DE 102017118134 A1 2/2018
(Continued)

OTHER PUBLICATIONS

Japanese Office Action dated Sep. 27, 2022.
English translation of Chinese Office Action dated Jun. 6, 2023.

*Primary Examiner* — Monica A Huson
(74) *Attorney, Agent, or Firm* — Dickinson Wright PLLC

(57) ABSTRACT

A method for producing a tube arrangement (1) for the transport of tempering medium, in which base body sections (6, 7) are provided, which have congruently configured separating surfaces (8), wherein at least one functional element (3) on at least one base body section (6, 7) is arranged in such a way that it can be in contact with the tempering medium, whereafter the base body sections (6, 7) are joined along the separating surface (8) and bonded to one another to form the tube arrangement (1).

14 Claims, 3 Drawing Sheets

(51) Int. Cl.
*B29C 49/78* (2006.01)
*H01M 10/625* (2014.01)
*B29L 23/00* (2006.01)

(52) U.S. Cl.
CPC ... *H01M 10/625* (2015.04); *B29C 2049/2047* (2013.01); *B29L 2023/22* (2013.01)

(58) Field of Classification Search
CPC ... B29C 65/48; B29C 66/02241; B29C 66/54; B29C 65/08; B29C 66/1142; B29C 2049/2047; F28F 21/062; F28F 1/022; H01M 10/625; F28D 1/0417; F28D 2021/0028; F28D 2021/008; F28D 2021/0043; B29L 2031/18; B29L 2023/004; B29L 2023/22; B29L 2031/779; Y02T 10/70; Y02E 60/10

See application file for complete search history.

(56) References Cited

U.S. PATENT DOCUMENTS

| | | |
|---|---|---|
| 2012/0068386 A1 | 3/2012 | Rushlander et al. |
| 2015/0017502 A1 | 1/2015 | Brenner et al. |

FOREIGN PATENT DOCUMENTS

| | | |
|---|---|---|
| JP | H550495 | 3/1993 |
| JP | H857963 | 3/1996 |
| JP | 2005094632 A | 4/2005 |
| JP | 2009023179 A | 2/2009 |
| JP | 2015199241 A | 11/2015 |
| JP | 2015199241 A | 6/2018 |
| JP | 2018051878 A | 10/2020 |
| WO | 2018072904 A1 | 4/2018 |

\* cited by examiner

METHOD FOR PRODUCING A TUBE ARRANGEMENT FOR THE TRANSPORT OF TEMPERING MEDIUM

RELATED APPLICATIONS

The present disclosure claims priority to and is a national phase application of European Application 20178064.0, filed on Jun. 3, 2020, the entire contents of each of which are incorporated herein by reference.

FIELD

The invention relates to a method for producing a tube arrangement for the transport of tempering medium and a temperature control circuit.

BACKGROUND

Temperature control media or tempering medium are required in electromobility. Batteries in electric vehicles, in particular lithium-ion batteries, have optimum performance only within a limited temperature range. Therefore, depending on the ambient temperature, it may be necessary to heat or cool the batteries. The drive unit of an electric vehicle therefore generally has a temperature control circuit with a pipe or tube arrangement, through which temperature control media can be conducted to the cells of the battery in order to control these within a desired temperature range. Due to the limitations of the installation space, the temperature control device should be as compact as possible.

Furthermore, it may be necessary to control the temperature of components of the entire drive unit of electric vehicles, in particular to cool them. In addition to the battery, this includes the power electronics and the electric motor. The charging electronics and the associated plug connections and lines can also be cooled by means of the temperature control device. This is particularly relevant in connection with fast charging processes.

In addition to use in a drive unit, a further area of application exists in connection with the rest of the vehicle electronics, in particular sensors and on-board computers. If a vehicle is equipped for autonomous driving, powerful sensors and powerful computers are required, wherein the systems are redundant. Because the installation space is limited, there is also a need for temperature control/cooling by means of a temperature control device in these systems.

Temperature control media are also used in air conditioning systems. Air conditioning systems, in particular mobile air conditioning systems, comprise a pipe or tube arrangement, which enables the temperature control medium to be transported between the individual units of the air conditioning system. In mobile air conditioning systems, for example air conditioning systems for air conditioning the interiors of motor vehicles, the tube arrangement is a comparatively complex structure and often includes pipes or tubes made of different materials, for example tubes or pipes made of metal, tube sections made of thermoplastic and tube sections made of rubber-like material. Although the conditions of use of the tube sections can be optimally matched to the respective requirements, the tube arrangement is costly, complex to assemble and difficult to recycle.

BRIEF SUMMARY

The present disclosure is based on the object of providing a tube arrangement for the transport of tempering medium, which can be produced simply and inexpensively.

This object is achieved with the features of claim 1. The subclaims refer to advantageous configurations.

In the method according to the disclosure for producing a tube arrangement for the transport of tempering medium (also referred to herein as temperature control medium or media), base body sections are first provided, which have congruently configured separating surfaces, wherein at least one functional element is then arranged on at least one base body section in such a way that it can be in contact with the tempering medium, whereafter base body sections joined along the separating surface and are materially connected to one another to form the tube arrangement.

Tube arrangements of temperature control circuits contain several functional elements necessary for the functionality of the temperature control circuit. These are, for example, throttle valves, check valves, switchable valves, pumps, flow sensors, connecting elements, connectors and temperature sensors. In the tube arrangement according to the invention, at least one of the functional elements is arranged in the base body, that is to say within the tube arrangement, so that it is in contact with the tempering medium.

The base body sections are preferably produced by providing a preform made of polymeric material, the preform being placed in a blow mold and the preform being blow molded into the shape of a base body, and the shaped base body then being opened so that the base body sections are created by the separating surface. The base body can be torn or cut open along the separating surface. It is advantageous here that the base body sections can be produced quickly and inexpensively. Furthermore, there is an excellent fit of the base body sections along the separating surface.

Alternatively, it is conceivable that the base body sections are produced separately from one another, for example by means of deep drawing or injection molding.

The tube arrangement consists of a base body made of polymer material by means of blow molding. Blow molding makes it possible to produce a base body with a complex shape. For example, the base body can comprise one or more channels, which can be shaped, for example curved, in the shape required for the installation location. Furthermore, it is particularly easy to form cross-section changes in the channels. For example, sections of the channels can be circular, whereas other sections of the channels are not round, for example oval or rectangular. As a result, the tube arrangement can be designed to be particularly space-saving and adapted to the installation site. The fact that the base body is first formed, then cut open, then fitted with functional elements and joined again, makes it possible to arrange complex functional elements in the base body. Furthermore, functional elements can be arranged in the interior of the base body, which are not suitable for being exposed to a blow molding process, for example because the functional elements are not sufficiently temperature or pressure stable.

The functional elements are formed separately from the base body. The functional elements can therefore in particular have components made of non-thermoplastic material and/or can be actively controlled. Such functional elements are, for example, throttle valves made of metallic material, switchable valves, check valves with metallic spring bodies, sensors, for example temperature sensors, pressure sensors or flow sensors, pumps, connecting elements or connectors for connecting the tube arrangement with aggregates or the like. The functional element can also be designed as a cooler and influence the temperature of the temperature control medium.

The separately formed functional elements are arranged within the base body. The base body in turn consists of a base body made of polymeric material produced by means of blow molding, which is made of a single material and is made in one piece. After the main body sections have been closed, the functional elements are arranged in a stationary manner in the main body. This enables the production of a functional tube arrangement with complex geometry with simple method steps.

At least one further functional element can be formed from the base body. For this purpose, the blow mold can be designed in such a way that the further functional element is molded into the base body during blow molding. This is particularly conceivable when the functional element is a passive functional element and does not have any moving parts. For example, the functional element can form a throttle valve. A throttle valve or expansion valve causes a local narrowing of the flow cross-section to reduce the pressure of the temperature control medium flowing through, and at the same time causes the temperature control medium to expand. The throttle valve is designed as an unregulated throttle valve and forms a constriction of the channel.

Because the throttle valve is formed directly from the base body, the tube arrangement can be manufactured particularly inexpensively and easily. The functional element can also be designed as a fluid distribution element. It is also conceivable that the functional element is designed as a connecting element or connector. As a result, the tube arrangement can be equipped to be connected to other components of a temperature control circuit.

At least one channel can be molded into the base body, the at least one functional element being arranged in the channel. As a result, the functional element is in direct contact with the temperature control medium and can either directly influence the volume flow of the temperature control medium or directly record status information of the temperature control medium, such as temperature, volume flow or pressure. Several channels can be molded into the base body, wherein a channel wall is formed between the channels. As a result, the base body can accommodate different tube sections of an air conditioning circuit, for example the duct section in front of and behind an evaporator. Both volume flows are separated from one another by the channel wall.

In one use according to the invention, the tube arrangement forms part of a temperature control circuit.

According to a first embodiment, the tube arrangement is part of an air conditioning circuit of an air conditioning system. The air conditioning system can in particular be designed as a mobile air conditioning system. The mobile air conditioning system, in turn, can be part of a motor vehicle, wherein the air conditioning system is used for air conditioning the vehicle interior. Because the base body of the tube arrangement may have a complex geometry and contain several functional elements, the tube arrangement is nevertheless easy to assemble and has only a few parts. To this extent, the tube arrangement according to the invention simplifies the complexity, in particular, of a mobile air conditioning system in a motor vehicle. This is particularly advantageous with regard to electrically driven motor vehicles, since these only have a very limited installation space due to the battery required for the electric drive. The blow molding method makes it possible for the tube arrangement to be adapted to the available installation space, wherein the channels for the transport of temperature control medium are dimensioned in such a way that optimal transport of temperature control medium is possible.

According to a second embodiment, the tube arrangement is part of a temperature control circuit of the drive unit of an electric vehicle. The tube arrangement supplies tempering medium to the elements of the drive unit to be temperature controlled, so that the elements can be temperature controlled within a desired temperature range. For example, the batteries can be heated or cooled depending on the requirements. Furthermore, the electric motors and components of the power electronics and also plug connections can be cooled by means of a tempering medium. The cooling of plug connections is particularly advantageous in fast charging processes, since during fast charging the plug connections can become very hot due to the high charging currents. Because the tube arrangement is blow molded, the tube arrangement can be produced in a wide variety of shapes. This is particularly advantageous with regard to the limited and complexly shaped installation space of the aforementioned components for a tube arrangement.

According to a third embodiment, the tube arrangement is part of a temperature control device, which is set up to control the temperature of components of the vehicle electronics, in particular to cool them. Components of the vehicle electronics are, for example, sensors and computers for autonomous driving as well as on-board computers.

BRIEF DESCRIPTION OF THE DRAWINGS

Some embodiments of the tube arrangement according to the invention are explained in more detail below with reference to the figures. These show, each schematically.

DETAILED DESCRIPTION

Figure 1:
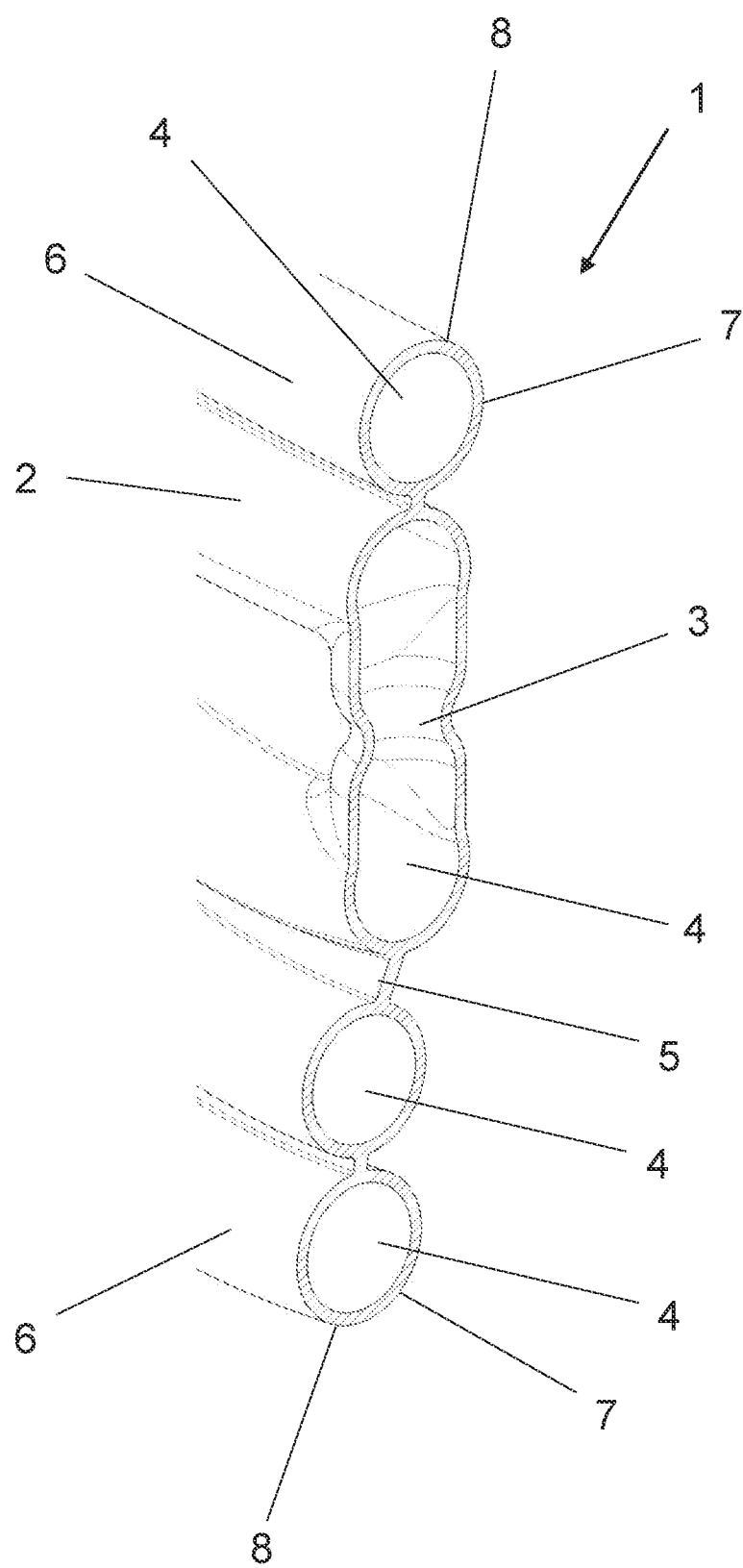
FIG. 1 shows a tube arrangement with a throttle valve molded into the base body.

FIG. 1 shows a tube arrangement 1 for the transport of temperature control medium or tempering medium, comprising a base body 2 made of polymer material and produced by means of blow molding. At least one functional element 3, which is in contact with the temperature control medium, is arranged in the base body 2. The functional element 3 is arranged in a channel 4, the functional element 3 being formed in one piece from the base body 2. The functional element 3 forms a throttle valve and is formed by a cross-sectional narrowing of the channel 4.

Figure 2:
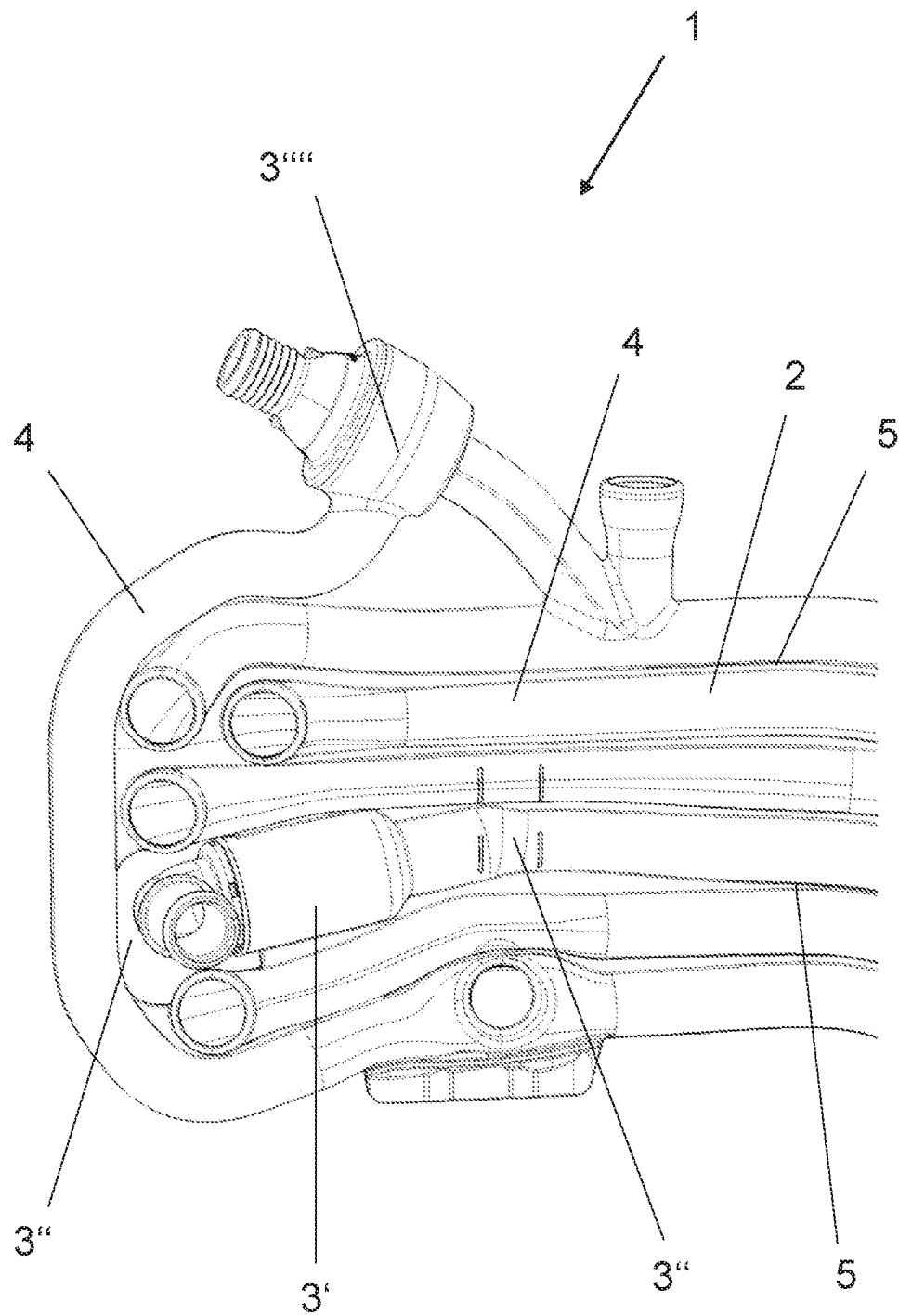
FIG. 2 shows a tube arrangement with several separately designed functional elements.

FIG. 2 shows a tube arrangement 1 according to FIG. 1, the base body 2 comprising a plurality of functional elements 3 which are formed separately from the base body 2 and are arranged in the interior of the base body 2. The base body 2 has a plurality of channels 4, a channel wall 5 each being located between the channels 4.

The tube arrangement 1 comprises several functional elements 3, including a check valve 3', a temperature sensor, a pressure sensor, a flow sensor and a connector in the form of a connection block 3" for connecting the tube arrangement 1 to adjacent aggregates or pipelines. Furthermore, the tube arrangement 1 has a throttle valve 3''', which is molded directly into a channel 4 and which is molded from the base body 2 as a single material and in one piece.

Figure 3:
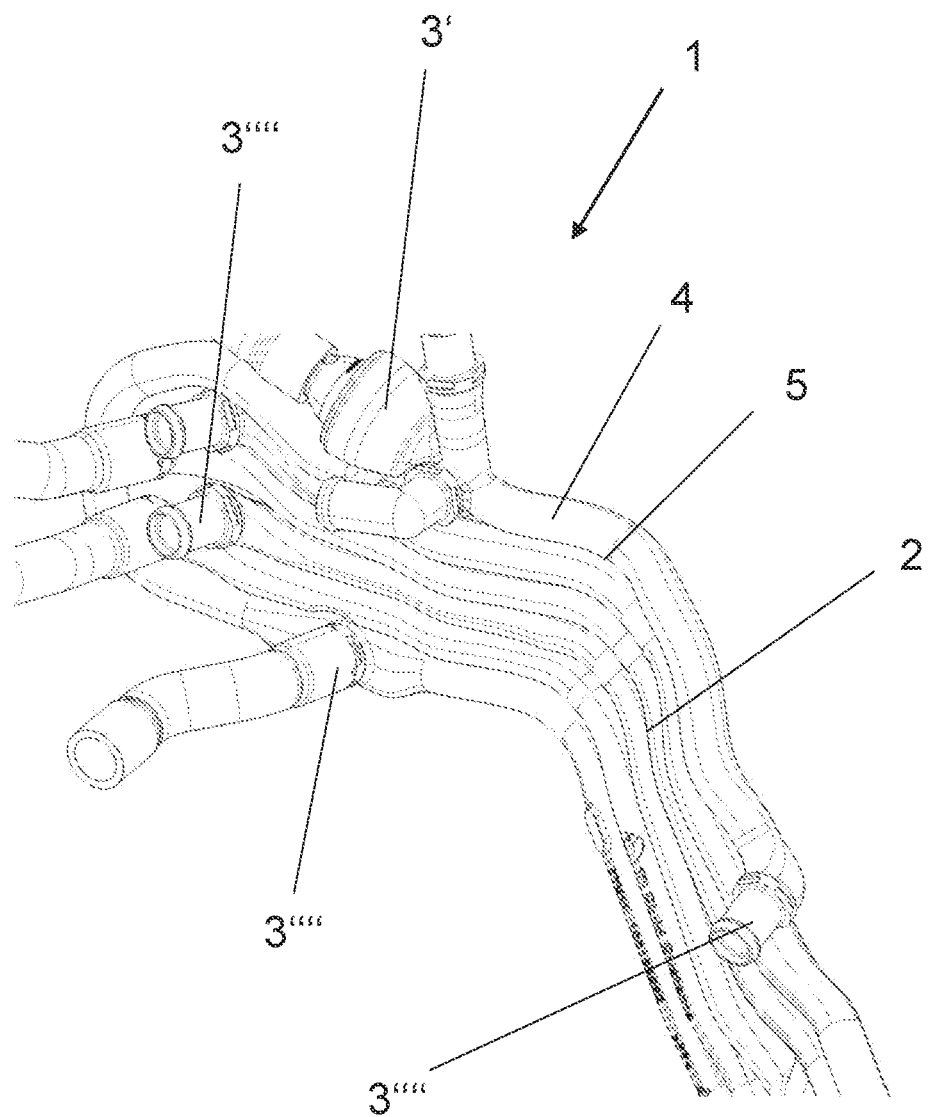
FIG. 3 shows a further tube arrangement with several separately designed functional elements.

FIG. 3 shows an alternative embodiment of the tube arrangement 1 shown in FIG. 2. Several functional elements 3 in the form of a check valve 3' and several connectors 3"" are introduced into the tube arrangement 1.

The tube arrangements 1 shown in FIGS. 1 to 3 form part of an air conditioning circuit of an air conditioning system, the air conditioning system being designed as a mobile air conditioning system of a motor vehicle. According to a further embodiment, the tube arrangements 1 form part of a temperature control circuit of the drive unit of an electric vehicle, wherein the tube arrangements 1 supply tempering medium to the cells of the batteries and the electrical control components and plug connections.

In a further embodiment, the tube arrangement 1 is part of a temperature control device, which is set up to control the temperature of components of the drive unit of electric vehicles. In addition to the battery, this includes the power electronics and the electric motors. Furthermore, the temperature control device is set up to cool the charging electronics and the associated plug connections and lines, which is particularly advantageous in connection with rapid charging processes.

Furthermore, the temperature control device can be set up to control the temperature of components of the remaining vehicle electronics, in particular to cool them. Such components are, for example, sensors and computers for autonomous driving and on-board computers.

In the method according to the invention for producing a tube arrangement 1 for the transport of tempering medium according to one of FIGS. 1 to 3, a preform or parison made of polymer material is first provided, the parison being arranged in a blow mold and the parison is formed as a base body 2 by means of blow molding. The shaped base body 2 is then opened so that base body sections 6, 7 with a separating surface 8 are produced. For this purpose, the base body 2 is torn open along the separating surface 8. At least one functional element 3 is arranged on at least one base body section 6, 7 in such a way that it can be in contact with the tempering medium. The base body sections 6, 7 are then joined along the separating surface 8 and connected to one another in a materially-bonded manner to form the tube arrangement 1. The materially-bonded connection can be made by heating the base body sections 6, 7 along the separating surface, by ultrasonic welding of the base body sections 6, 7, or by means of an adhesive.

The invention claimed is:

1. A method for producing a tube arrangement for the transport of tempering medium, in which base body sections are provided, which have congruently configured separating surfaces, wherein a parison made of polymeric material is provided, wherein the parison is arranged in a blow mold and the parison is shaped into a base body by means of a blow molding process, the shaped base body being opened so that the base body sections with the separating surface are created, wherein at least one functional element is arranged at the at least one base body section in such a way that it can be in contact with the tempering medium, whereafter the base body sections are joined along the separating surface and bonded to one another to form the tube arrangement, wherein a plurality of channels are formed from the base body, wherein a channel wall is located between adjacent channels and extends between adjacent portions of the base body defining adjacent channels, and wherein the at least one functional element is arranged in a channel of the plurality of channels, wherein the blow mold is designed in such a way that a throttle valve is integrally formed within the channel of the base body during blow molding.

2. The method according to claim 1, wherein the base body for producing the base body sections is torn or cut open along the separating surface.

3. The method according to claim 1, wherein the blow mold is designed in such a way that at least one further functional element is formed in the base body during blow molding.

4. The method according to claim 2, wherein the further functional element formed from the base body forms a throttle valve, connecting element or connector.

5. The method according to claim 1, wherein the channel wall is formed along the separating surface.

6. The method according to claim 1, wherein the channel wall connects adjacent channels along their length.

7. The method according to claim 1, wherein the channel wall engages adjacent channels to position the adjacent channels in a spaced apart relationship.

8. A method for producing a tube arrangement for the transport of tempering medium comprising:
providing a parison made of polymeric material;
arranging the parison in a blow mold and shaping the parison into a base body by means of a blow molding process;
opening the base body to create base body sections with congruently configured separating surfaces; and
joining the base body sections along the separating surfaces and bonded the base body sections to one another to form the tube arrangement, wherein the base body defines a plurality of channels with a channel wall located between adjacent channels, and wherein the base body defines a throttle valve integrally formed within a channel of the plurality of channels such that the throttle valve can be in contact with the tempering medium.

9. The method according to claim 8, wherein the base body for producing the base body sections is torn or cut open along the separating surface.

10. The method according to claim 8, wherein the blow mold is designed in such a way that at least one further functional element is formed in the base body during blow molding.

11. The method according to claim 10, wherein the further functional element formed from the base body forms a throttle valve, connecting element or connector.

12. The method according to claim 8, wherein the channel wall is formed along the separating surface.

13. The method according to claim 8, wherein the channel wall connects adjacent channels along their length.

14. The method according to claim 8, wherein the channel wall engages adjacent channels to position the adjacent channels in a spaced apart relationship.

* * * * *